No. 658,339. Patented Sept. 25, 1900.
T. F. BYRNES.
SEWER TRAP.
(Application filed Mar. 9, 1899.)
(No Model.)

WITNESSES
Rich. A. George
Phebe A. Tanner

INVENTOR
THOMAS F. BYRNES
By Risley Love
ATTORNEYS.

THE NORRIS PETERS CO., PHOTO-LITHO., WASHINGTON, D. C.

UNITED STATES PATENT OFFICE.

THOMAS F. BYRNES, OF UTICA, NEW YORK.

SEWER-TRAP.

SPECIFICATION forming part of Letters Patent No. 658,339, dated September 25, 1900.

Application filed March 9, 1899. Serial No. 708,318. (No model.)

*To all whom it may concern:*

Be it known that I, THOMAS F. BYRNES, a citizen of the United States of America, and a resident of Utica, county of Oneida, New York, have invented certain new and useful Improvements in Sewer-Traps, of which the following is a specification.

My invention relates to an improvement in sewer-traps, as shown by the accompanying drawings, in which similar letters of reference refer to corresponding parts in the several figures.

Figure 1:
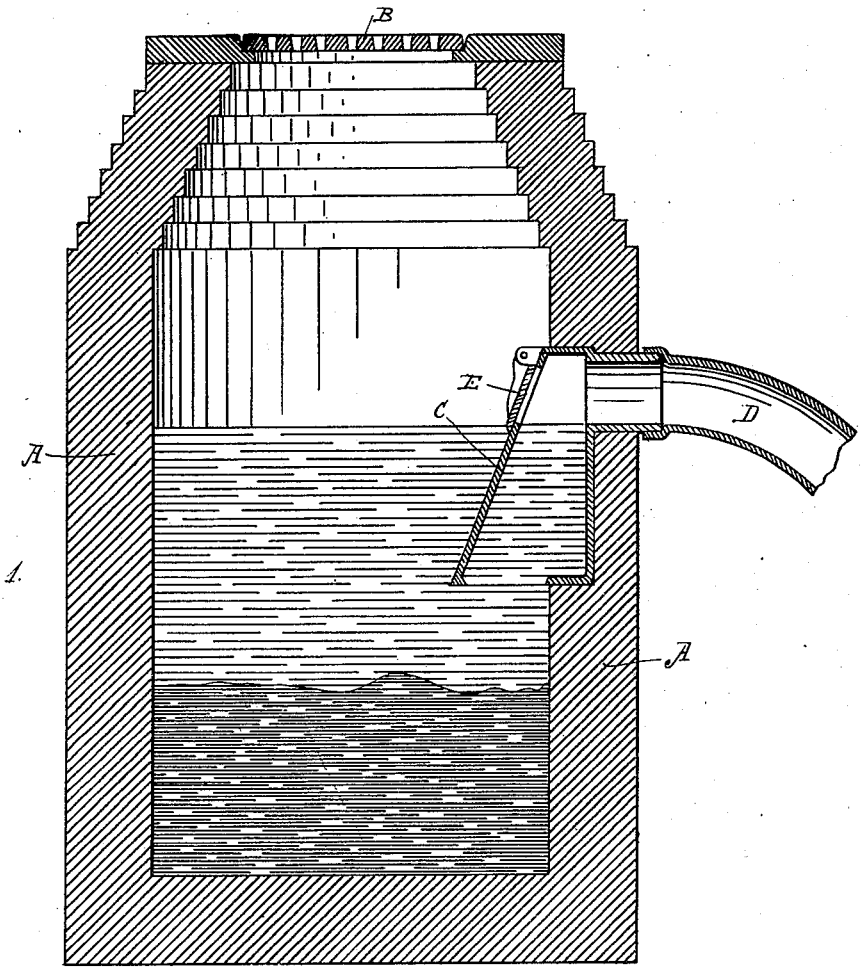
Figure 2:
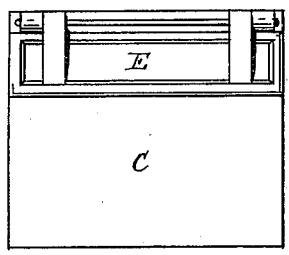
Figure 3:
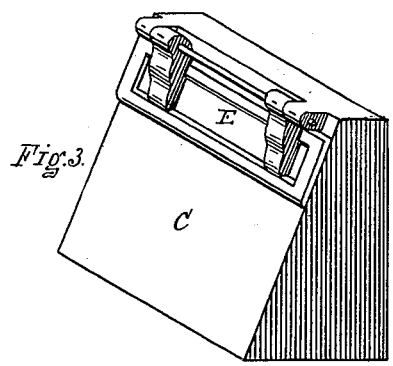
Figure 4:
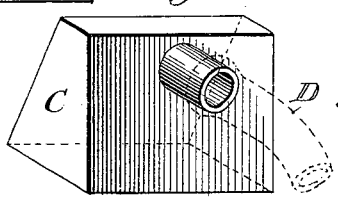

Figure 1 shows a sectional view of the catch-basin with the sewer-trap in its proper position relative thereto. Fig. 2 shows a front view of the trap, and Fig. 3 a view in perspective. Fig. 4 represents a rear view of the trap in perspective, showing a thimble cast thereon for the outflow of sewage.

Referring again to the figures more in detail, A refers to the wall of an ordinary cesspool or catch-basin or like structure which it is desired to automatically drain continually or intermittently, according to the regularity or irregularity of the flow into it. B represents the ordinary grated cover. In the walls of this cesspool or catch-basin is situated the sewer-trap C, and D represents the drain from the cesspool through the sewer-trap to the main sewer or other proper outlet for drainage. The sewer-trap C is constructed of cast metal or other proper material and in a suitable manner. Its general shape is shown in Fig. 3. One side is made of a rectangular or square surface, on which is cast a thimble for attachment to or adjustment in the sewer-pipe, or that side of the trap may be pierced in a suitable manner to allow the insertion of a sewer-pipe or drain-pipe. This portion of the sewer-trap is designed to be built into a wall of the cesspool or catch-basin, and this surface is bounded by a top, a bottom, and two sides, as shown in Figs. 1 and 3. The opposite side of the sewer-trap is not on a plane parallel with the above-mentioned side, but is made at an angle therewith, so that when the trap is properly built into the wall the outer surface deflects outwardly and downwardly. A portion of the bottom of the sewer-trap is cut away where it projects from the wall of the cesspool, so as to admit of the passage of drainage matter through the bottom of the trap to the sewer-pipe. The upper part of the front surface of the sewer-trap is also cut away above a line horizontal to the bottom of the thimble cast on the rear of the sewer-trap or the opening made therein when the trap is in proper position in the walls of the cesspool. This opening in front of the trap is rectangular in its shape and the edges are properly ground, so as to present a plane surface. Over this opening is suspended a trap E by proper mechanism. My drawings show the trap or door suspended by lugs cast on the trap proper and corresponding lugs on the lid or door and which are to be held in position by a brass rod or rods connecting them, which manner is deemed most expedient for the purpose of avoiding the rusting of hinges. These lugs project so far, according to the particular uses of the trap, that the trap is automatically opened by pressure of gas from within. This lid or door projects a suitable distance below the lower edge of the opening which it covers and its surface is ground to correspond with the surface of the opening, or other proper means are adopted to secure a close-fitting joint between the lid and the body of the sewer-trap. The lid or door also projects below the surface of the water in the cesspool, the water thereby becoming a weight to hold the door in a closed position until the accumulation of gas within the sewer-pipes becomes sufficient to open the trap. This lid or door is suspended in such a manner that it will automatically open outwardly with a pressure of from one-half to one pound from inside.

It is designed that my sewer-trap will be placed a sufficient distance above the bottom of the cesspool or catch-basin, so that sand or other refuse naturally will sink to the bottom, will find a place of lodgment there, and will not be carried out with the sewage, as would be the case did the exit of the catch-basin start from a point on or near the bottom and level therewith. By having the drain run from the upper part of the catch-basin it is seen that the water may be carried off when it is of proper height without disturbing in any way the sediment, which remains in the bottom and can be removed at any convenient time.

I am aware that several patents have been heretofore issued for improvements in catch-basins in which trap-doors have been placed to prevent the escape of sewer-gas from the main sewer or from the drainage-pipes into the catch-basins and thence into the street. These swinging traps or doors, however, so far as I have discovered, have all been made to swing outwardly from the cesspool, so that they have in their automatic closing absolutely prevented any sewer-gas from escaping from the drains into the cesspool and thence into the street. This I conceive to be a serious objection to that class of sewer-traps, inasmuch as an accumulation of gas in the sewers may not be able to find any vent, and consequently damage may be done or sewer-gas may be forced through the connecting-pipes into houses. By my invention I design to obviate this difficulty. Ordinarily the trap E will be closed and the water can pass off without any hindrance, such as was met with in the patterns of sewer-traps above referred to, where the swinging door was in the path of the sewage. Gases forming in the sewers and in the drain-pipes will be held there by the weight of the trap E and by the water-trap formed by the front edge of my sewer-trap extending into the water held in the catch-basin; but if a strong accumulation of gas forms in the sewers or drains it will not be forced through the house-drains into the dwellings, but will find an escape by the automatical lifting of the trap E, which is designed to be so constructed and hung and can be so made in each particular case as to yield at a pressure just short of that which would drive the gases back through the house-drains.

Having described my invention and set forth its merits, what I claim as new, and desire to secure by Letters Patent, is—

1. In a sewer-trap a box or casing, its front surface deflecting outwardly and downwardly, its rear surface adapted to connect with drainage-pipes, its bottom open to permit flowage; its face provided with an upwardly and outwardly swinging door in its closed position extending below the level of the bottom of the drainage-pipe and hung at its upper edge on hinges projecting from the face of the trap and by corresponding hinges on the door, permitting the door to automatically swing outwardly at a certain fixed pressure from within, substantially as set forth.

2. In a sewer-trap, a hood projecting outwardly and downwardly from the wall of the cesspool, an opening in the upper part of the hood extending downwardly as far as the outer drain, a lid or trap pivotally suspended over the opening in said hood, its lower edge extending below the surface of the water in the cesspool when at its height, the pivoted door yielding outwardly with the pressure of the sewer-gas from within the trap, in combination, substantially as set forth.

3. In a sewer-trap a metal integral casing provided with an opening in the bottom for the ingress of sewage, an opening in the back for the egress of sewage, an opening in the front opposite the egress, a door suspended over the opening presenting a surface corresponding with the surface of the sewer-trap and in its closed position extending below the level of the bottom of the drainage-pipe, in combination, substantially as set forth.

4. In a sewer-trap a casing supported in and projecting from the wall of the cesspool, an open bottom to the projecting casing, an egress opening from the casing outward, an opening through the wall of the casing, a door hinged to the casing above the water-line and adapted when closed to fall below the water-line, the door pivotally mounted to open inwardly to the cesspool by the pressure of the sewer-gas, combined, substantially as set forth for the purposes stated.

Signed by me at Utica, New York, this 25th day of February, 1899.

THOMAS F. BYRNES.

Witnesses:
PHEBE A. TANNER,
C. HERBERT WILSON.